(12) United States Patent
Miller et al.

(10) Patent No.: US 11,600,171 B2
(45) Date of Patent: Mar. 7, 2023

(54) CROSSWALK WARNING LIGHTING SYSTEM

(71) Applicant: AVAILED TECHNOLOGIES CORP., Victoria (CA)

(72) Inventors: Gregory Miller, Victoria (CA); Robert Magyar, Victoria (CA)

(73) Assignee: Availed Technologies Corp.

( * ) Notice: Subject to any disclaimer, the term of this patent is extended or adjusted under 35 U.S.C. 154(b) by 0 days.

(21) Appl. No.: 17/537,278

(22) Filed: Nov. 29, 2021

(65) Prior Publication Data

US 2022/0172605 A1   Jun. 2, 2022

(51) Int. Cl.
| | |
|---|---|
| G08G 1/005 | (2006.01) |
| F21S 9/03 | (2006.01) |
| F21V 7/04 | (2006.01) |
| F21Y 115/10 | (2016.01) |

(52) U.S. Cl.
CPC .............. G08G 1/005 (2013.01); F21S 9/035 (2013.01); F21V 7/048 (2013.01); *F21Y 2115/10* (2016.08)

(58) Field of Classification Search
CPC ............. F21S 9/035; G08G 1/095; F21V 7/04
See application file for complete search history.

(56) References Cited

U.S. PATENT DOCUMENTS

| | | |
|---|---|---|
| 2005/0128105 A1 | 6/2005 | Green |
| 2005/0128405 A1* | 6/2005 | Lee ............... G02F 1/133784 349/141 |
| 2010/0207788 A1 | 8/2010 | Jones |
| 2010/0214127 A1 | 8/2010 | Lloyd |
| 2012/0001772 A1 | 1/2012 | Jones |
| 2012/0306665 A1 | 12/2012 | Jones |
| 2015/0084791 A1 | 3/2015 | Jang |
| 2016/0358465 A1 | 12/2016 | Jones |
| 2017/0039849 A9 | 2/2017 | Jones |
| 2017/0200366 A1 | 7/2017 | Jones |
| 2017/0256161 A1 | 9/2017 | Jones |
| 2019/0035262 A1 | 1/2019 | Brady |
| 2020/0074846 A1 | 3/2020 | York |

* cited by examiner

*Primary Examiner* — Karabi Guharay
(74) *Attorney, Agent, or Firm* — Baumgartner Patent Law; Marc Baumgartner (57) ABSTRACT

A crosswalk warning light is provided, the crosswalk warning light comprising: a housing which includes a front, the front including a first end and a second end, at least one end including at least one slot, a face with at least one aperture, the aperture defining an outside edge, a step with a riser, the step including or housing at least one optical element, the riser adjacent the outside edge, a top shaped to conform to the front, a bottom shaped to conform to the top, and a back; and at least one bank of light emitting diode (LED) lights positioned such that a portion of the bank of light emitting diodes is aligned with the aperture and a portion of the bank of light emitting diodes is aligned with the step, wherein the at least one optical element is configured to deviate an incident optical path by ninety degrees to provide a deviated optical path that is aligned with the at least one slot.

20 Claims, 8 Drawing Sheets

CROSSWALK WARNING LIGHTING SYSTEM

CROSS REFERENCE TO RELATED APPLICATIONS

The present invention is related to, and claims the benefit of Canadian Application Serial No. 3,103,594, filed on Dec. 1, 2020, and entitled CROSSWALK WARNING LIGHTING SYSTEM and which is hereby incorporated in its entirety including all tables, figures, and claims.

FIELD

The present technology is an improved crosswalk warning light system. More specifically, it is a warning light system that utilizes one lighting unit to alert both a driver and a pedestrian that the pedestrian has activated the lighting system and will be crossing the road.

BACKGROUND

Pedestrian cross walks are the sites of numerous collisions between motor vehicles and pedestrians. The most dangerous cross walks are those that are not at a light-controlled intersection. Warning lights are often used at these cross walks. A pedestrian activates a warning light system when they want to cross the road. The light system then flashes to alert drivers that a pedestrian is about to cross or is crossing the road. A major deficiency in the earlier designs was that the pedestrian was not informed whether or not the warning light system was activated. For this reason, the warning light systems were designed that had two light units—one that faced the pedestrian and one that faced the motor vehicles. This involved two light circuits for each light system. This is not only overly complex but is subject to failure.

Examples of the prior art include United States Patent Application Publication No. 20200074846 which discloses a pedestrian safety lighting device and system configured to mount to and be used in connection with existing traffic signals and intersections and increase awareness of pedestrians and vehicles of one another on a roadway. In some embodiments, the pedestrian safety lighting device and system comprises a housing, at least one light source, a communication means, and a power source. More specifically, the communication means is configured to receive external data from the same or a different traffic signal, selectively illuminate the light source, and generate and transmit internal data to the same or a different traffic signal, or a data center. In further embodiments, the device and system may also comprise a light directing element, a light processing element, one or more sensors, a speaker, a camera, and a microphone. This is an overly complex system.

United States Patent Application Publication No. 20190035262 discloses apparatuses, methods and storage media associated with controlling a pedestrian crossing or traffic light. In embodiments, an apparatus may include a control unit to extend a duration of a pedestrian crossing state of the pedestrian crossing or traffic light in response to receipt of sensor data that convey detection of at least one commence crossing event of the pedestrian, while the pedestrian crossing or traffic light is in a pedestrian crossing state, but yet to receive sensor data that convey detection of all corresponding end of crossing event or events of the one or more pedestrians, prior to expiration of the duration of the pedestrian crossing state. The controller may extend the duration of the pedestrian crossing state until receipt of sensor data that convey receipt of all corresponding end of crossing event/events of the one or more pedestrians, or until a timeout threshold is reached. This is an overly complex system.

United States Patent Application Publication No. 20170256161 discloses safety systems for enhancing the visibility of pedestrian crosswalk traffic control devices and related methods. In some embodiments, a plurality of crosswalk safety modules is provided, each of which is configured to be removably coupled with a separate crosswalk traffic control device. Each of the plurality of crosswalk safety modules may comprise one or more lights and/or one or more speakers or alarms, configured to, upon actuation, improve the visibility of a crosswalk traffic control device coupled with the accompanying crosswalk safety module to motorists. The system may further comprise a remote control configured to generate a signal for remote operation of each of the plurality of crosswalk modules. Each of the plurality of crosswalk modules is preferably configured such that actuation of the remote-control results in coordinated operation of the lights and/or sounds associated with the plurality of crosswalk modules. This is an overly complex system.

United States Patent Application Publication Nos. 20170200366, 20170039849, 20160358465, 20160071413, 20120306665, 20120001772 and 20100207788 disclose a flashing beacon may include a signal unit, a control unit associated with the signal unit, a solar panel or collector, and an activation device that may all be mounted or otherwise positioned on a post of a roadway sign. Light units associated with the signal unit may be programmed to flash on and off in a unique wig-wag pattern. Further, a light bar may also be used with the beacon to generate an intense flash of light soon after activation of the beacon as an additional means of grabbing the attention of the operator of a vehicle. This requires separate light systems for each light which is complicated and overly expensive. Further, as there are separate light systems, the lights facing the crosswalk could flash without the lights facing the motorist flashing.

United States Patent Application Publication No. 20150084791 discloses an apparatus and method for managing safety of a pedestrian at a crosswalk, which determine the location of a pedestrian in a crosswalk area, and then selectively provide a pedestrian signal extension service, an approaching vehicle notification service, and a pedestrian danger notification service. A presented apparatus includes a monitoring unit for monitoring a crosswalk area in which a pedestrian waits or crosses a street. A detection unit detects whether a pedestrian is present in the crosswalk area, based on information output from the monitoring unit. A location determination unit determines a location of the pedestrian detected by the detection unit. A safety determination unit determines whether the pedestrian is safe, based on the location of the pedestrian and a state of a pedestrian signal. An information provision unit outputs danger notification information based on a safety/danger determination signal output from the safety determination unit. This is overly complex and is not foolproof.

United States Patent Application Publication No. 20100214127 discloses an embodiment of the present invention is an illuminated stop sign for allowing pedestrians to control traffic. The system comprises a fixed support assembly; a pedestrian activated mechanism; a timer set for a predetermined period of time when the pedestrian activated mechanism is activated; and an octagonal display non-removably mounted to the fixed support assembly comprising a backlight within the display and a display surface comprising a word "STOP" visible when the backlight is illuminated and substantially not visible when the backlight is not illuminated, the backlight being illuminated until the predetermined period of time is expired. This does not alert the pedestrian that the stop light is on.

United States Patent Application Publication No. 20050128105 discloses a solar-powered crosswalk warning system is disclosed. The crosswalk warning system comprises two or more crosswalk warning beacons, located on opposite sides of the road. Each beacon comprises a solar panel to recharge a battery, a battery back, a control unit to charge the battery pack during daylight hours, a communication unit to communicate to the second crosswalk beacon, a traffic signal lamp ton warn oncoming traffic, and a triggering means by which the pedestrian can activate the beacons. This does not alert the pedestrian that the warning light is on.

What is needed is a crosswalk warning light system that relies on a single lighting unit with a single lighting circuit to alert both a driver and a pedestrian that the warning lights are flashing. It would be preferable if it was a mechanical solution to an optical problem. It would be further preferable if it alerted the pedestrian if the warning lighting system failed to be activated. It would be further preferable if it was fool proof.

SUMMARY

The present technology a crosswalk warning light system that relies on a single lighting unit with a single lighting circuit to alert both a driver and a pedestrian that the warning lights are flashing. It is a mechanical solution to an optical problem. It alerts the pedestrian if the warning lighting system failed to be activated, hence it is fool proof.

In one embodiment, a crosswalk warning light, the crosswalk warning light is provided comprising: a housing which includes a front, the front including a first end and a second end, at least one end including at least one slot, a face with at least one aperture, the aperture defining an outside edge, a step with a riser, the step including or housing at least one optical element, the riser adjacent the outside edge, a top shaped to conform to the front, a bottom shaped to conform to the top, and a back; and at least one bank of light emitting diode (LED) lights positioned such that a portion of the bank of light emitting diodes is aligned with the aperture and a portion of the bank of light emitting diodes is aligned with the step, wherein the at least one optical element is configured to deviate an incident optical path by between sixty degrees to one hundred and twenty degrees to provide a deviated optical path that is aligned with the at least one slot.

In the crosswalk warning light, there may be two apertures, two banks of LED lights and two steps with risers.

In the crosswalk warning light, there may be two slots in the first end and two slots in the second end.

In the crosswalk warning light, the LED lights may be on a single circuit.

The crosswalk warning light may further comprise a solar panel in electrical communication with the LED lights.

In the crosswalk warning light, the riser may include a reflective inner surface which includes at least one angle which function as an acute forty-five degree to fifty-five degree angle to the face.

In the crosswalk warning light, the reflective inner surface may be an acute forty-five degrees to fifty-five degrees to the face.

In the crosswalk warning light, the reflective inner surface may be a polished mirrored surface.

In the crosswalk warning light, the at least one optical element may be at least one prism.

In the crosswalk warning light, the at least one optical element may be at least one lens.

In the crosswalk warning light, the at least one optical element may be a combination of optical elements selected from the group consisting of mirrors, prisms and lenses.

In another embodiment, a method of alerting a pedestrian that a crosswalk warning light has been activated is provided, the method comprising: the pedestrian activating a crosswalk warning light system; the crosswalk warning light system directing light in a first optical path to the road in front of the crosswalk and directing light in a second optical path to the road behind the crosswalk; and the crosswalk warning light system directing light in a third optical path to at least one optical element which is configured to deviate the third optical path by ninety degrees to provide a deviated optical path that is aligned with the crosswalk and is between sixty degrees to one hundred and twenty degrees to the first and the second optical paths.

In the method, the deviation of the third optical path may be effected by reflection.

In the method, the deviation of the third optical path is ninety degrees to the first and the second optical path.

In another embodiment, a crosswalk warning light system is provided, the crosswalk warning light system including two light, each light comprising: a housing which includes a front, the front including a first end and a second end, at least one end including at least one slot, a face with at least one aperture, the aperture defining an outside edge, a step with a riser, the step including or housing at least one optical element, the riser adjacent the outside edge, a top shaped to conform to the front, a bottom shaped to conform to the top, and a back; and at least one bank of light emitting diode (LED) lights positioned such that a portion of the bank of light emitting diodes is aligned with the aperture and a portion of the bank of light emitting diodes is aligned with the step, wherein the at least one optical element is configured to deviate an incident optical path by between sixty degrees to one hundred and twenty degrees to provide a deviated optical path that is aligned with the at least one slot.

In the crosswalk warning light system, each light may include two apertures, two banks of LED lights and two steps with risers.

In the crosswalk warning light system, each light may include two slots in the first end and two slots in the second end.

In the crosswalk warning light system, the LED lights in each light may be on a single circuit.

The crosswalk warning light system may further comprise a solar panel in electrical communication with the LED lights.

In the crosswalk warning light system, each light may include the riser which includes a reflective inner surface which includes at least one angle which, in total, function is an acute forty-five degree to fifty-five degree angle to the face.

In the crosswalk warning light system, the reflective inner surface may be an acute forty-five degrees to fifty-five degrees to the face.

In the crosswalk warning light system, the reflective inner surface may be a polished mirrored surface.

In the crosswalk warning light system, the at least one optical element may be at least one prism.

In the crosswalk warning light system, the at least one optical element may be at least one lens.

In the crosswalk warning light system, the at least one optical element may be a combination of optical elements selected from the group consisting of mirrors, prisms and lenses.

FIGURES

FIG. 9A-9D show the effect of different angles of the optical element relative to the face. Only one bank of LEDs is shown.

DESCRIPTION

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

DEFINITIONS

Optical element—in the context of the present technology, an optical element is a mirror, a lens or a prism.

Optical elements—in the context of the present technology, optical elements are a combination of a mirror or mirrors and a lens or lenses, a mirror or mirrors and a prism or prisms, or a lens or lenses and a prism or prisms. The mirrors may be planer, convex or concave.

Deviated optical path—in the context of the present technology, a deviated optical path is one that has undergone one or more of reflection, refraction or deviation.

DETAILED DESCRIPTION

Figure 1:
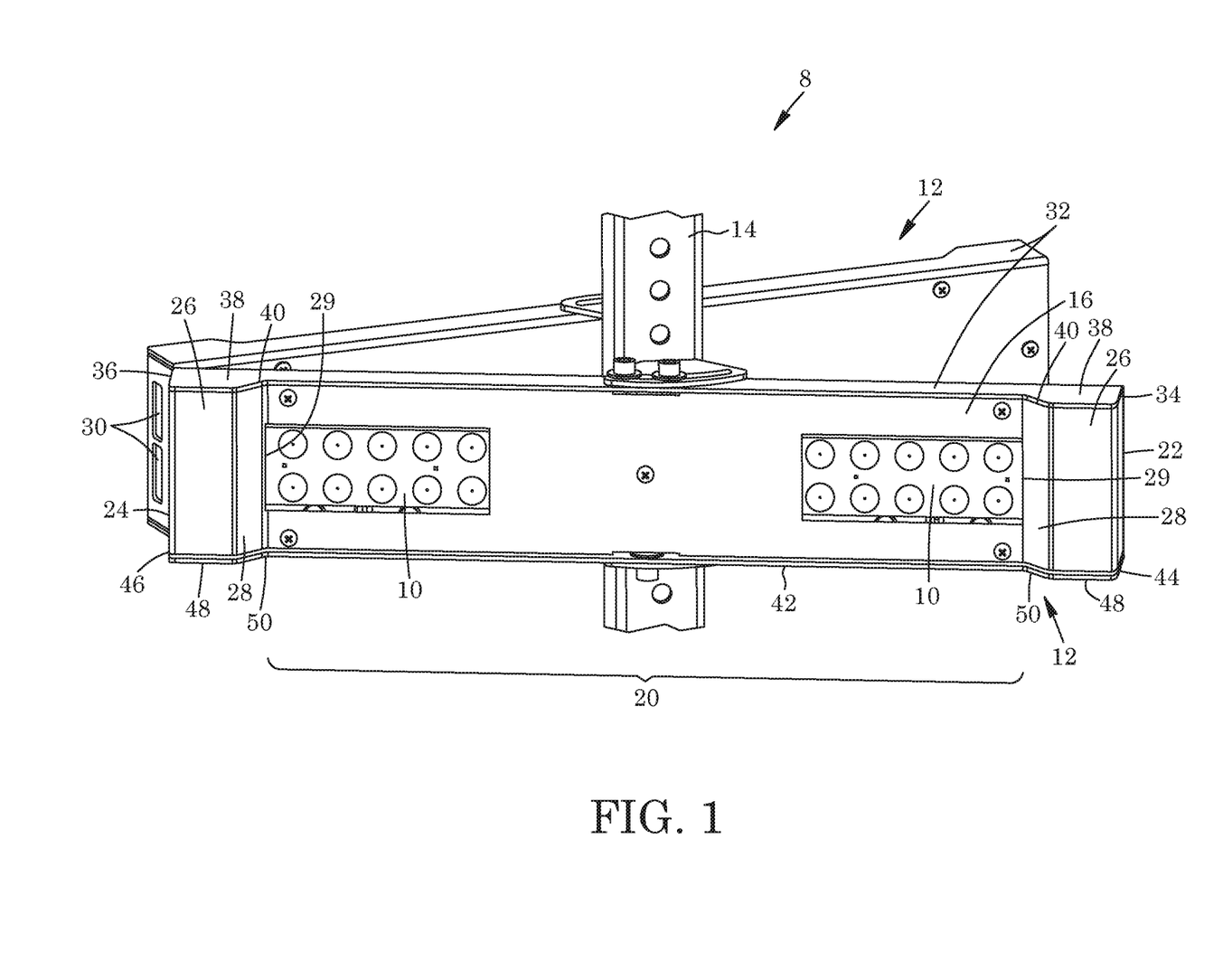
FIG. 1 is a schematic of the crosswalk warning lighting system of the present technology.

A crosswalk warning lighting system, generally referred to as 8 is shown in FIG. 1. Two banks of light emitting diode lights (LEDs) 10 are housed in a housing, generally referred to as 12 which is pivotally mounted on a vertical support such as a pole 14. Ten LEDs 10 can be seen in each bank. The LEDs have about a 20 degree beam pattern. The housing 12 is positioned on the pole 14 such that the LEDs 10 face an oncoming vehicle. A second housing 12 also houses two banks of LEDs 10 and faces the vehicles coming the opposite direction. The front 16 of the housing 12 has a pair of apertures 18 in the face 20 of the front 16. Proximate to the first end 22 and the second end 24 is a step 26 which has a riser 28 which is at an obtuse angle of about 120 to about 160 degrees, preferably 135 degrees to the face 20 of the front 16 and abuts an outside edge 29 of each aperture 18. The first end 22 and the second end 24 are perpendicular to the face 20 and the LEDs 10. There are two slots 30 in each end 22, 24. The top 32 is shaped to conform to the shape of the front 16, hence it has a first end 34 and a second end 36 that is perpendicular to the remainder of the top 32 and a step 38 which has a riser 40 which is at about 120 to about 160, preferably 135 degrees to the remainder of the top 32. The bottom 42 is also shaped to conform to the shape of the front 16, hence it has a first end 44 and a second end 46 that is perpendicular to the remainder of the bottom 42 and a step 48 which has a riser 50 which is at about 120 to about 160, preferably 135 degrees to the remainder of the bottom 42.

Figure 2:
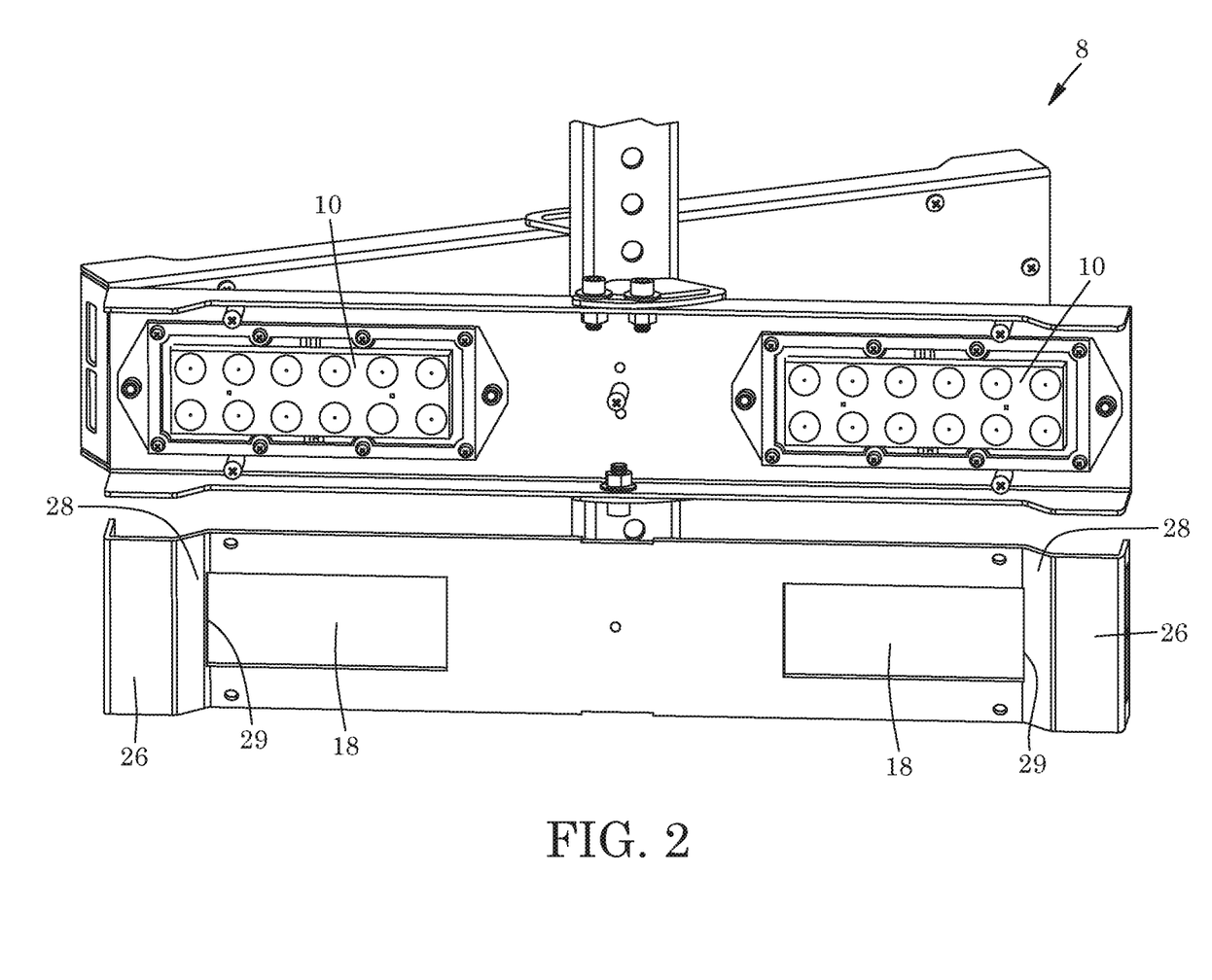
FIG. 2 is an exploded view of the crosswalk warning lighting system of FIG. 1.

As shown in FIG. 2, the two banks of LEDs 10 each have twelve LEDs 10. Comparing FIG. 1 with FIG. 2, it can be seen that the apertures 18 are sized such that only ten of the LEDs 10 in each bank are in the aperture 18.

Figure 3:
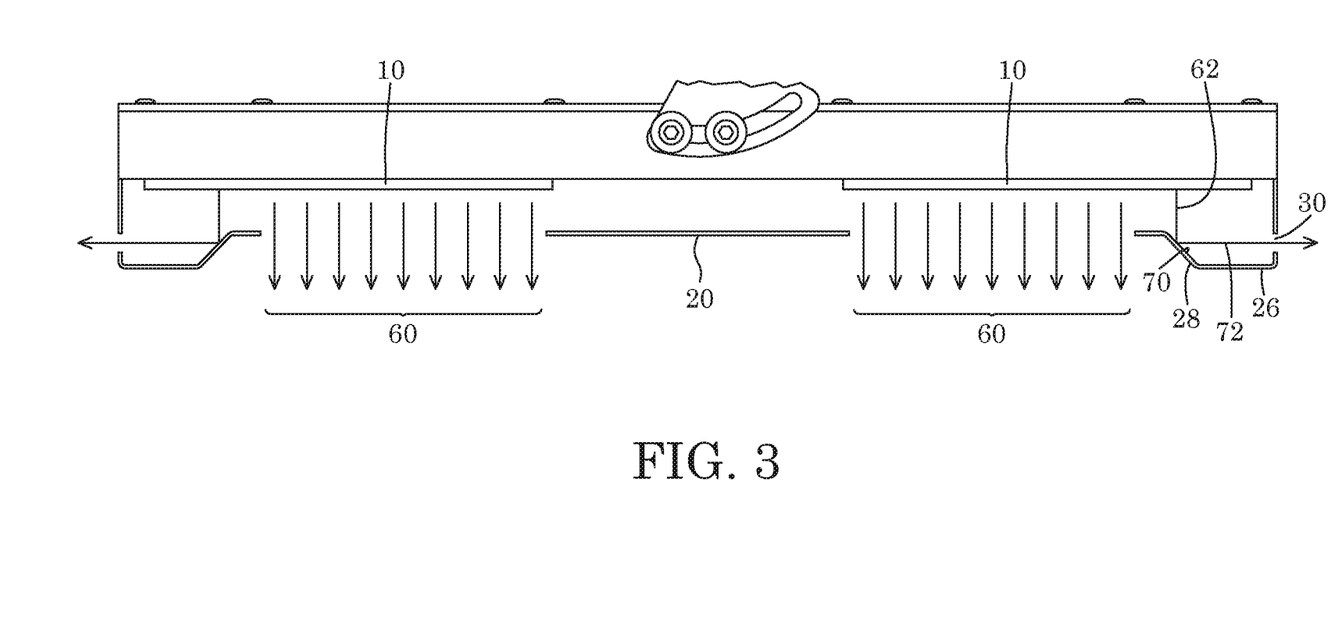
FIG. 3 is a schematic of the optical paths of the crosswalk warning lighting system of FIG. 1.

As shown in FIG. 3, the optical path 60 of the ten LEDs 10 is through the apertures 18 and is perpendicular to the face 20 of the front 16. The incident optical path 62 of the remaining two LEDs 10 is onto the reflective inner surface 70 of the riser 28, which is an acute forty-five degrees to fifty-five degree from the face 20. The inner surface 70 of the riser 28 is unpolished aluminum. In another embodiment, it is a polished mirrored surface, preferably electropolished. In an alternative embodiment the inner surface is provided with a mirrored surface. The light is reflected by the inner surface 70 of the riser 28, hence the reflected optical path 72 is at right angles to the incident optical path 62, is aligned with the two slots 30 in the respective end 22, 24 and passes through the two slots 30. The reflected optical path 72 is also at right angles to the optical path 60 of the ten LEDs 10. As the crosswalk is perpendicular to the road, a pedestrian sees the light from the reflected optical path 72 of the two LEDs 10 while a driver sees the light from the optical path 60 of the ten LEDs 10. There is no need for a separate bank of LEDs and the associated circuitry.

Figure 4:
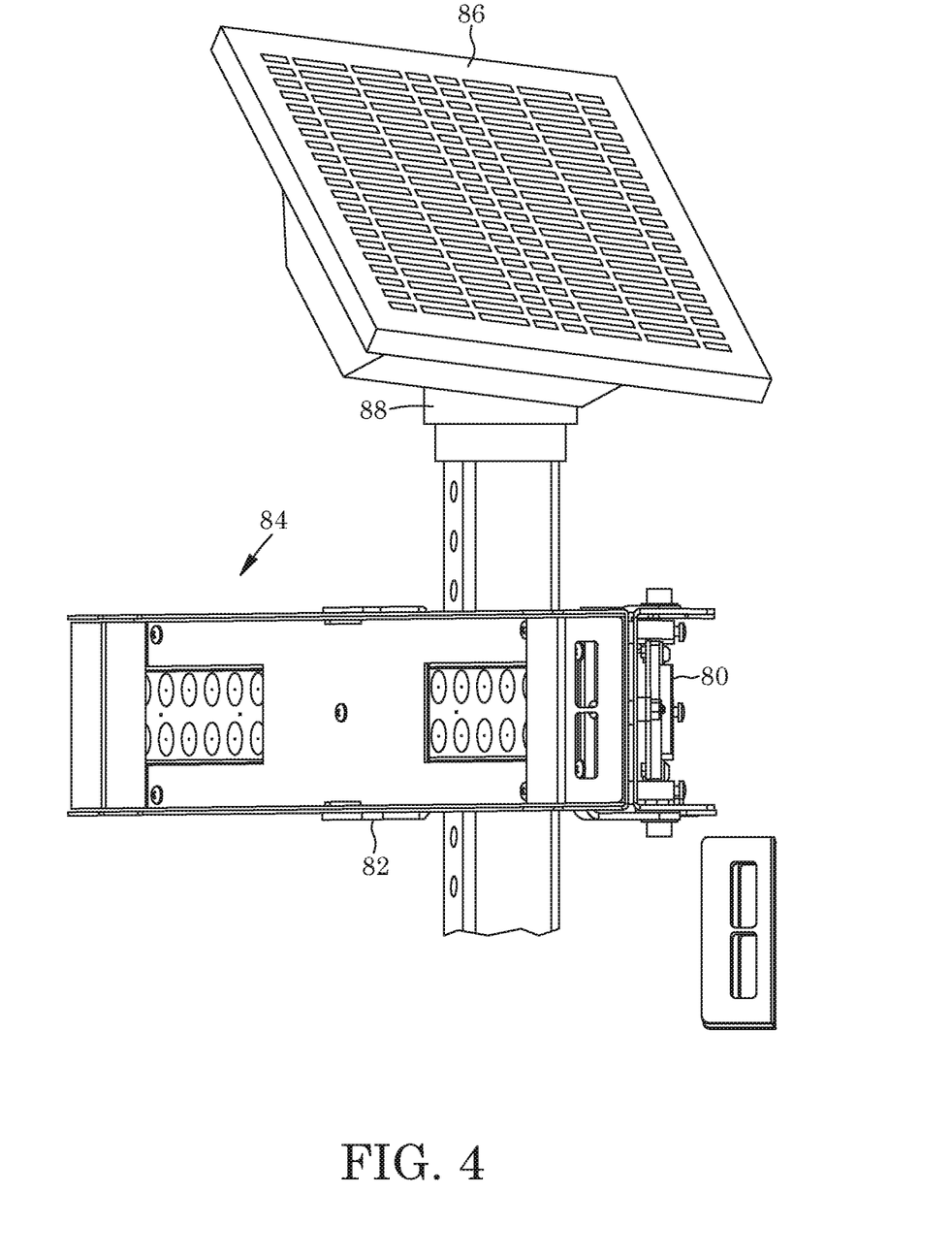
FIG. 4 is a schematic of the complete system ready for deployment of the crosswalk warning lighting system of FIG. 1.

As shown in FIG. 4, the two housings 12 are pivotally attached to one another with pivot mounts 80, 82 which are attached the housing 12. This allows for correct positioning of the lights, generally referred to as 84. The crosswalk warning lighting system 8 is powered with solar panels 86, with power stored in a battery 88. There is a single circuit for the LEDs 10 in each housing 12, for a total of two circuits per system 8.

Figure 5:
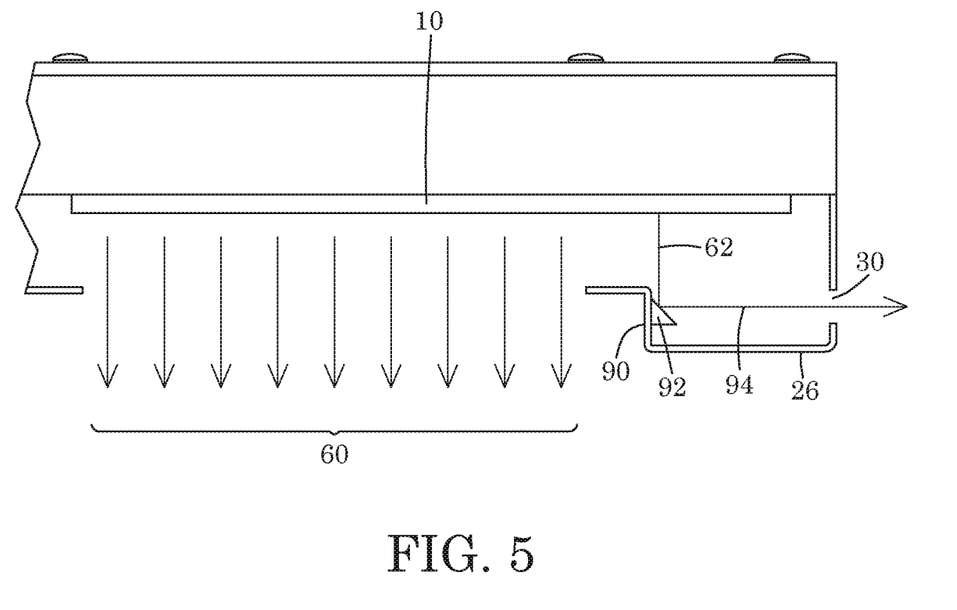
FIG. 5 is a schematic of an alternative embodiment crosswalk warning lighting system of FIG. 1. Only one bank of LEDs is shown.

In an alternative embodiment, shown in FIG. 5, the step 26 has a riser 90 that is between about ninety degrees to about 160 degrees to the face 20 of the front 16. A ninety-degree prism 92 is housed in the step 26 and is positioned such that the incident optical path 62 is deviated by ninety degrees to provide a deviated optical path 94. The deviated optical path 94 is aligned with the slots 30 and passes through the slots 30. As the crosswalk is perpendicular to the road, a pedestrian sees the light from the deviated optical path 94 of the two LEDs 10 while a driver sees the light from the optical path 60 of the ten LEDs 10. There is no need for a separate bank of LEDs and the associated circuitry.

Figure 6:
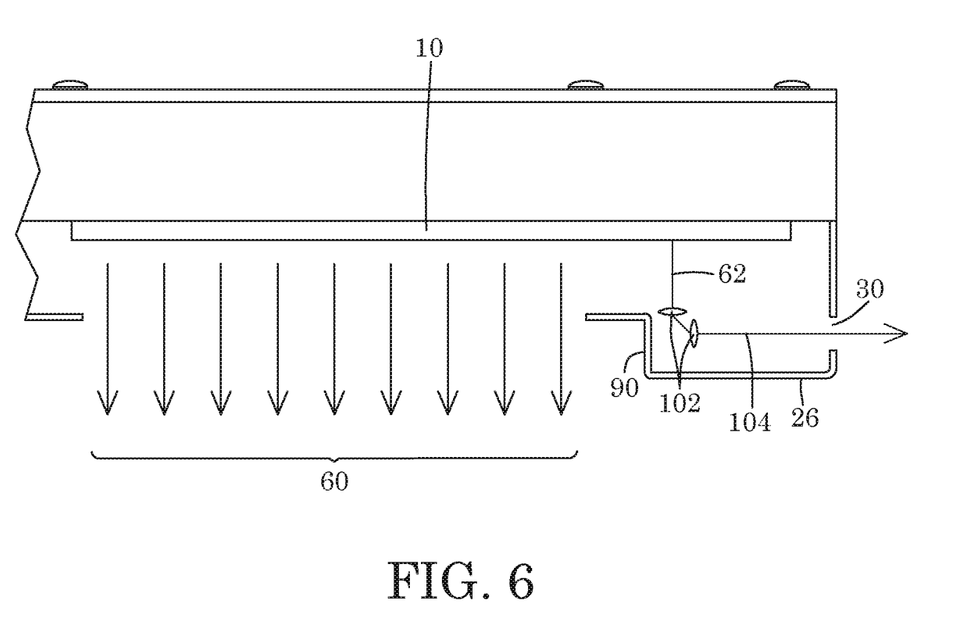
FIG. 6 is a schematic of an alternative embodiment crosswalk warning lighting system of FIG. 1. Only one bank of LEDs is shown.

In another alternative embodiment, shown in FIG. 6, the step 26 has a riser 90 that is between about ninety degrees to about 160 degrees to the face 20 of the front 16. A series of lenses 102 are housed in the step 26 and are positioned such that the incident optical path 62 is refracted by ninety degrees to provide a refracted optical path 104. The refracted optical path 104 is aligned with the slots 30 and passes through the slots 30. As the crosswalk is perpendicular to the road, a pedestrian sees the light from the refracted optical path 104 of the two LEDs 10 while a driver sees the light from the optical path 60 of the ten LEDs 10. There is no need for a separate bank of LEDs and the associated circuitry.

Figure 7:
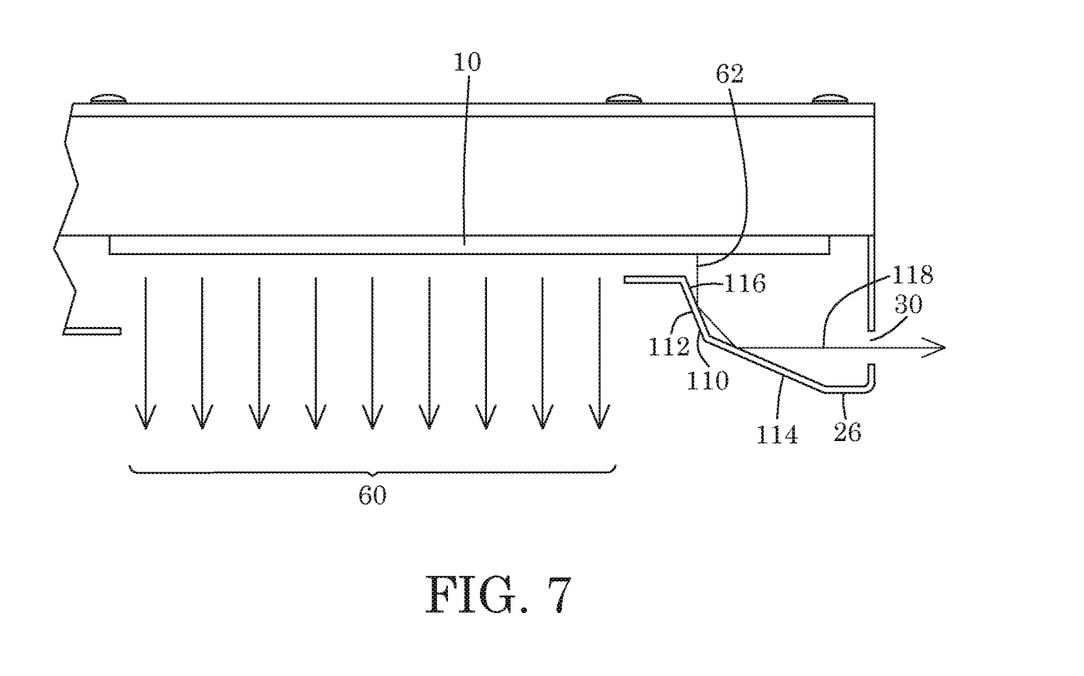
FIG. 7 is a schematic of an alternative embodiment crosswalk warning lighting system of FIG. 1. Only one bank of LEDs is shown.

In another alternative embodiment, shown in FIG. 7, the step 26 has a riser 110 that has an inner surface 116 with two or more sections 112, 114 whose angles, when combined, function as a forty-five degree to fifty-five degree angle (to determine suitable angles, an angle less than 45 to 55 degrees is subtracted from an angle greater than 45 to 55 degrees to equal 45 to 55 degrees). The incident optical path 62 of the remaining two LEDs 10 is onto the inner surface 116 of the riser 110. The inner surface 116 of the riser 28 is unpolished aluminum. In another embodiment, it is a polished mirrored surface, preferably electropolished. In an alternative embodiment the inner surface is provided with a mirrored surface. The light is reflected by the inner surfaces 116 of the sections 112, 114 the riser 110, hence the reflected optical path 118 is at right angles to the incident optical path 62, is aligned with the two slots 30 in the respective end 22, 24 and passes through the two slots 30. The reflected optical path 118 is also at right angles to the optical path 60 of the ten LEDs 10. As the crosswalk is perpendicular to the road, a pedestrian sees the light from the reflected optical path 118 of the two LEDs 10 while a driver sees the light from the optical path 60 of the ten LEDs 10. There is no need for a separate bank of LEDs and the associated circuitry.

Figure 8:
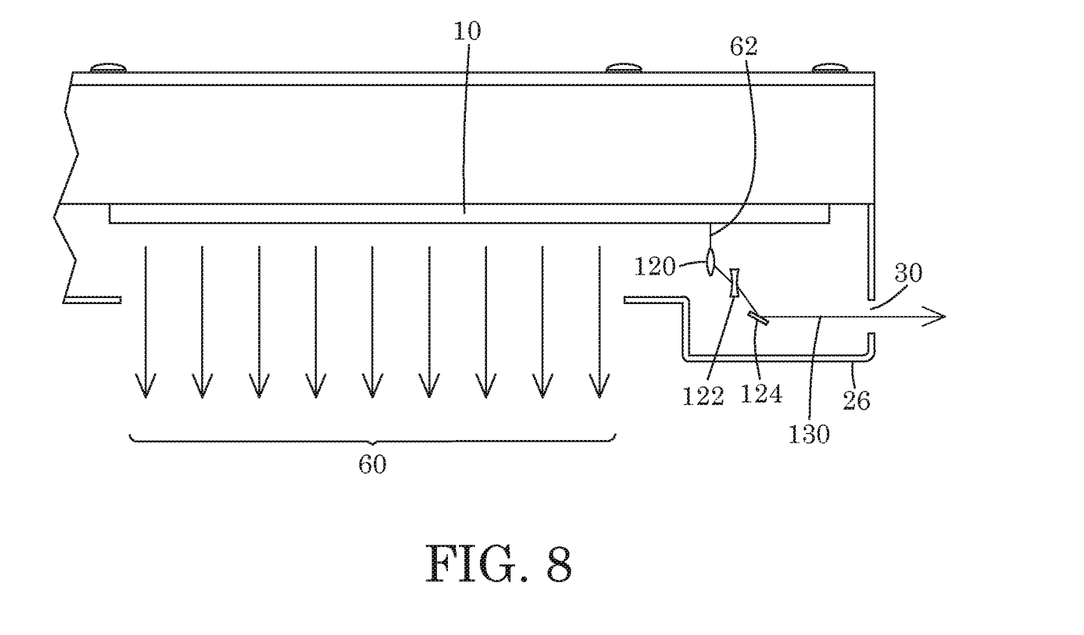
FIG. 8 is a schematic of an alternative embodiment crosswalk warning lighting system of FIG. 1. Only one bank of LEDs is shown.

In another embodiment, shown in FIG. 8, optical elements, (which may be two or more) 120, 122, 124 are housed in the step 26. The optical elements may be combinations of one or more lenses, one or more mirrors and one or more prisms, one or more lenses and one or more prisms, one or more mirrors and one or more lenses or one or more mirrors and one or more prisms. The optical elements 120, 122, 124, in combination, result in the incident optical path 62 being one or more of reflected, refracted or deviated by ninety degrees to produce a shifted light optical path 130, which is at right angles to the incident optical path 62, is aligned with the two slots 30 in the respective end 22, 24 and passes through the two slots 30. The shifted optical path 130 is also at right angles to the optical path 60 of the ten LEDs 10. As the crosswalk is perpendicular to the road, a pedestrian sees the light from the shifted optical path 130 of the two LEDs 10 while a driver sees the light from the optical path 60 of the ten LEDs 10. There is no need for a separate bank of LEDs and the associated circuitry.

Figure 9A:
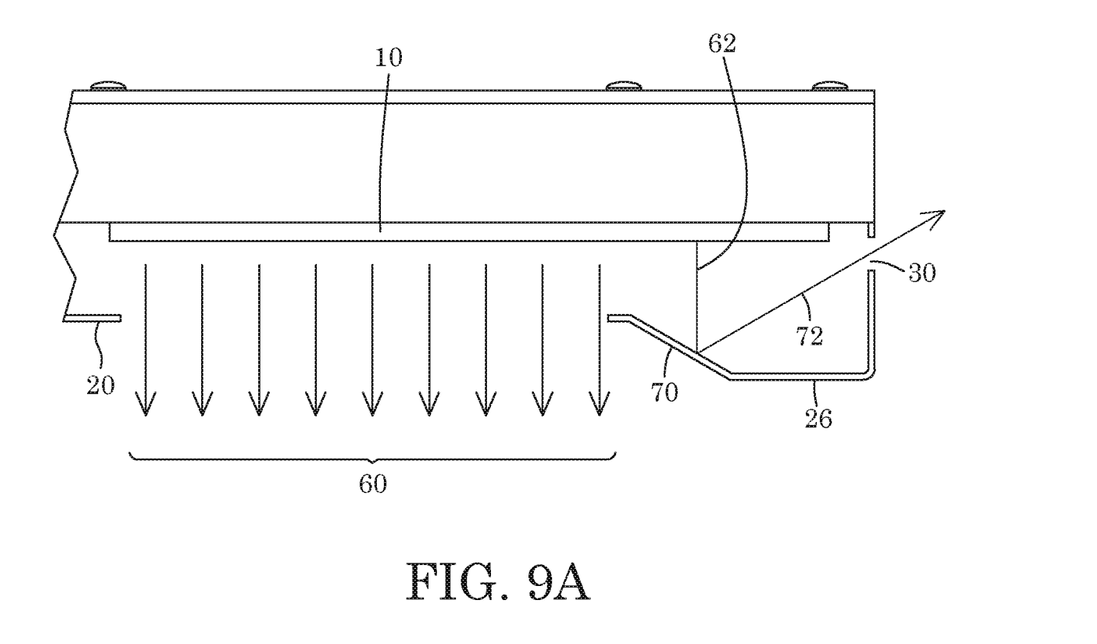
FIG. 9A is a schematic showing an optical light path deviated by 60 degrees.
Figure 9B:
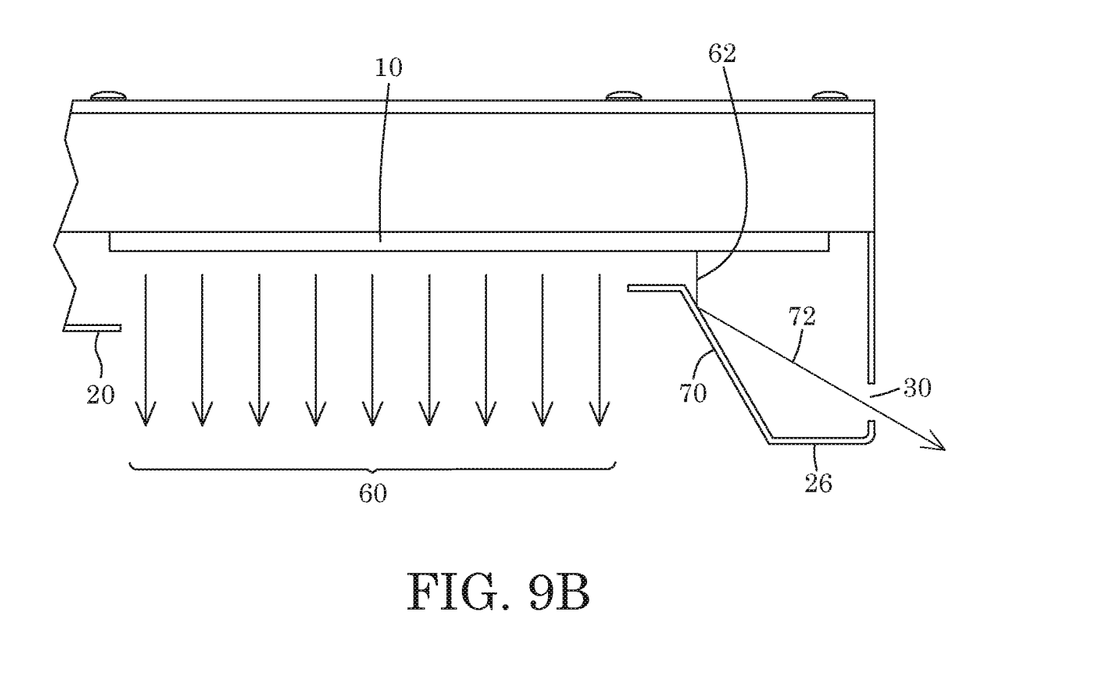
FIG. 9B shows an optical light path deviated by 120 degrees.
Figure 9C:
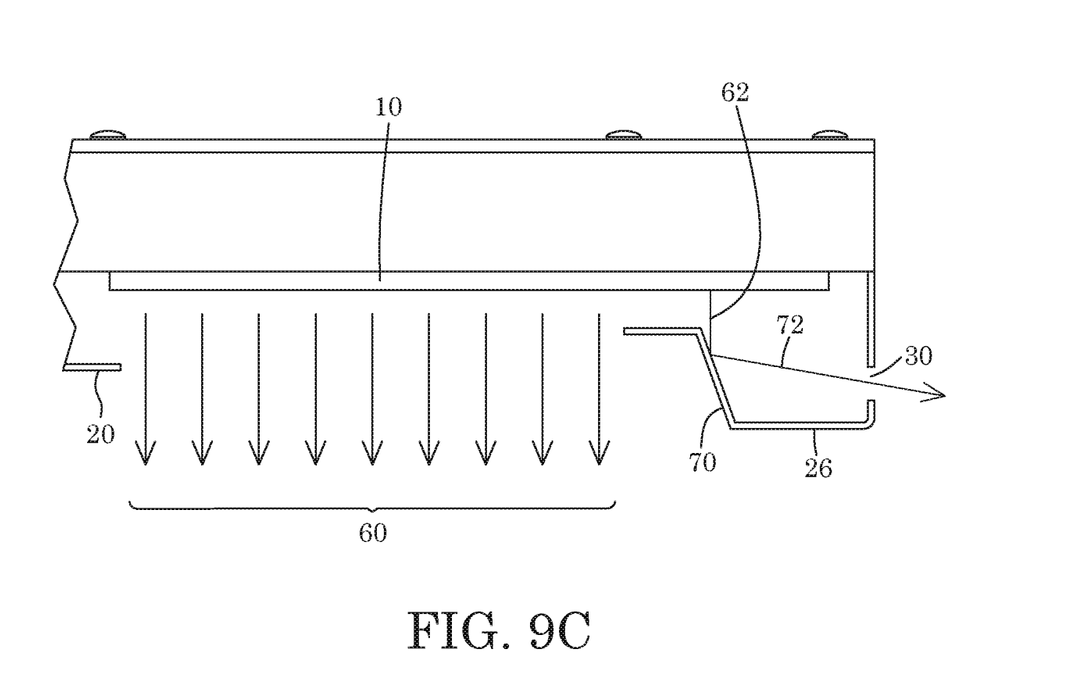
FIG. 9C shows an optical light path deviated by 100 degrees.
Figure 9D:
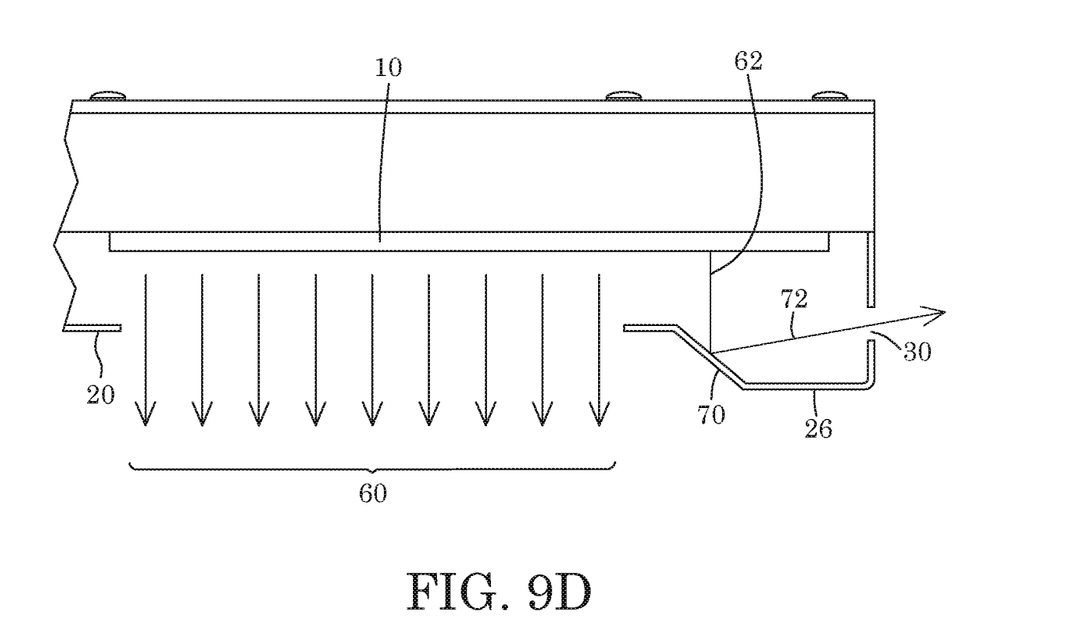
FIG. 9D shows an optical light path deviated by 80 degrees.

In alternative embodiments, the one or more optical elements provide a deviated light path 72, 94, 104, 118, 130 of between about 60 degrees to about 120 degrees relative to the incident optical path 62, preferably about 80 degrees to about 100 degrees. Using the embodiment of FIGS. 1-2 as an example, FIG. 9A-9D show exemplary alternative embodiments. FIG. 9A shows the optical path when the incident optical light path 62 strikes the optical element 70 which is angled at 30 degrees to the face 20. The reflected optical light path 72 is about 60 degrees relative to the incident optical light path 62. FIG. 9B shows the optical path when the optical element 70 is angled at 60 degrees to the face 20. The reflected optical light path 72 is about 120 degrees relative to the incident optical light path 62. FIG. 9C shows the optical light path when the optical element 70 is angled at about 50 degrees to the face 20. The reflected optical light path 72 is about 100 degrees relative to the incident light path 62. FIG. 9D shows the optical light path when the optical element 70 is angled at about 40 degrees to the face 20. The reflected optical light path 72 is about 80 degrees relative to the incident optical light path 62. Similarly, prisms and lens may be selected that have surfaces that deviate and refract the optical light path between about 60 degrees to about 120 degrees.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize or be able to ascertain using no more than routine experimentation, many equivalents to the specific example embodiments specifically described herein. Such equivalents are intended to be encompassed in the scope of the claims, if appended hereto or subsequently filed.

The invention claimed is:

1. A crosswalk warning light, the crosswalk warning light comprising: a housing which includes a front, the front including a first end and a second end, at least one end including at least one slot, a face with at least one aperture, the aperture defining an outside edge, a step with a riser, the step including or housing at least one optical element, the riser adjacent the outside edge, a top shaped to conform to the front, a bottom shaped to conform to the top, and a back; and at least one bank of light emitting diode (LED) lights positioned such that a portion of the bank of light emitting diodes is aligned with the aperture and a portion of the bank of light emitting diodes is aligned with the step, wherein the at least one optical element is configured to deviate an incident optical path by between sixty degrees to one hundred and twenty degrees to provide a deviated optical path that is aligned with the at least one slot.

2. The crosswalk warning light of claim 1, wherein there are two apertures, two banks of LED lights and two steps with risers.

3. The crosswalk warning light of claim 2, wherein there are two slots in the first end and two slots in the second end.

4. The crosswalk warning light of claim 3, wherein the LED lights are on a single circuit.

5. The crosswalk warning light of claim 4, further comprising a solar panel in electrical communication with the LED lights.

6. The crosswalk warning light of claim 5, wherein the riser includes a reflective inner surface which includes at least one angle which function as an acute forty-five degree to fifty-five degree angle to the face.

7. The crosswalk warning light of claim 6, wherein the reflective inner surface is an acute forty-five degrees to fifty-five degrees to the face.

8. The crosswalk warning light of claim 7, wherein the reflective inner surface is a polished mirrored surface.

9. The crosswalk warning light of claim 5, wherein the at least one optical element is at least one prism.

10. The crosswalk warning light of claim 5, wherein the at least one optical element is at least one lens.

11. The crosswalk warning light of claim 5, wherein the at least one optical element is a combination of optical elements selected from the group consisting of mirrors, prisms and lenses.

12. A method of alerting a pedestrian that a crosswalk warning light has been activated, the method comprising: the pedestrian activating a crosswalk warning light system; the crosswalk warning light system directing light in a first optical path to the road in front of the crosswalk and directing light in a second optical path to the road behind the crosswalk; and the crosswalk warning light system directing light in a third optical path to at least one optical element which deviates the third optical path by between sixty degrees to one hundred and twenty degrees to provide a deviated optical path that is aligned with the crosswalk, and is between sixty degrees to one hundred and twenty degrees to the first and the second optical paths.

13. The method of claim 12, wherein the deviation of the third optical path is effected by reflection.

14. The method of claim 13 wherein the deviation of the third optical path is ninety degrees to the first and the second optical path.

15. A crosswalk warning light system, the crosswalk warning light system including two light, each light comprising: a housing which includes a front, the front including a first end and a second end, at least one end including at least one slot, a face with at least one aperture, the aperture defining an outside edge, a step with a riser, the step including or housing at least one optical element, the riser adjacent the outside edge, a top shaped to conform to the front, a bottom shaped to conform to the top, and a back; and at least one bank of light emitting diode (LED) lights positioned such that a portion of the bank of light emitting diodes is aligned with the aperture and a portion of the bank of light emitting diodes is aligned with the step, wherein the at least one optical element is configured to deviate an incident optical path by between sixty degrees to one hundred and twenty degrees to provide a deviated optical path that is aligned with the at least one slot.

16. The crosswalk warning light system of claim 15, wherein each light includes two apertures, two banks of LED lights and two steps with risers.

17. The crosswalk warning light system of claim 16, wherein each light includes two slots in the first end and two slots in the second end.

18. The crosswalk warning light system of claim 17, wherein each light includes the riser which includes a reflective inner surface which includes at least one angle which, in total, function an acute forty-five degree to fifty-five degree angle to the face.

19. The crosswalk warning light system of claim 18, wherein the reflective inner surface is an acute forty-five degrees to fifty-five degrees to the face.

20. The crosswalk warning light system of claim 19, wherein the reflective inner surface is a polished mirrored surface.

* * * * *

UNITED STATES PATENT AND TRADEMARK OFFICE
CERTIFICATE OF CORRECTION

| | | |
|---|---|---|
| PATENT NO. | : 11,600,171 B2 | |
| APPLICATION NO. | : 17/537278 | |
| DATED | : March 7, 2023 | |
| INVENTOR(S) | : Gregory Miller et al. | |

It is certified that error appears in the above-identified patent and that said Letters Patent is hereby corrected as shown below:

On the Title Page

Item (30), please insert the following:
--(30) Foreign Application Priority Data
December 1, 2020 (CA).......................CA 3103594--

Signed and Sealed this
Tenth Day of September, 2024

Katherine Kelly Vidal
*Director of the United States Patent and Trademark Office*